United States Patent [19]

Renaud et al.

[11] Patent Number: 4,664,241
[45] Date of Patent: May 12, 1987

[54] CLUTCH RELEASE BEARING ASSEMBLY

[75] Inventors: Pierre Renaud, Le Plessis Trevise; Philippe Lassiaz, Boulogne, both of France

[73] Assignee: Valeo, Paris, France

[21] Appl. No.: 571,671

[22] Filed: Jan. 17, 1984

[30] Foreign Application Priority Data

Jan. 17, 1983 [FR] France .................. 83 00613

[51] Int. Cl.⁴ .......................................... F16D 23/14
[52] U.S. Cl. ................................... 192/98; 192/89 B
[58] Field of Search ................ 192/89 B, 98, 70.13; 403/349

[56] References Cited

U.S. PATENT DOCUMENTS

| | | | |
|---|---|---|---|
| 2,110,136 | 3/1938 | Douglas | 403/349 |
| 2,472,586 | 6/1949 | Harvey | 403/349 |
| 2,813,607 | 11/1957 | Hauseserman | 192/89 B |
| 2,822,559 | 2/1958 | Manville | 403/349 |
| 3,277,988 | 10/1966 | Pitner | 192/98 |
| 3,785,466 | 1/1974 | Morai et al. | 192/89 B |
| 3,973,659 | 8/1976 | Ernst et al. | 192/89 B |
| 4,184,578 | 1/1980 | Moore et al. | 192/89 B |
| 4,228,882 | 10/1980 | Huber et al. | 192/89 B |

FOREIGN PATENT DOCUMENTS

| | | | |
|---|---|---|---|
| 2613952 | 10/1977 | Fed. Rep. of Germany | 192/98 |
| 2639766 | 3/1978 | Fed. Rep. of Germany | 192/98 |
| 2494796 | 5/1982 | France | 192/98 |
| 1338207 | 11/1973 | United Kingdom | 192/98 |

Primary Examiner—Margaret A. Focarino
Assistant Examiner—H. A. Odar
Attorney, Agent, or Firm—Charles E. Brown; Charles A. Brown

[57] ABSTRACT

In a clutch cover assembly there is associated with the clutch release device a coupling member adapted to permit a clutch release bearing to be coupled to the clutch release device by means of a coupling ring. Means are further provided for axially coupling the coupling member to the clutch release device. These coupling means are integral with the coupling ring and are formed by appropriately shaped parts of the latter.

23 Claims, 22 Drawing Figures

CLUTCH RELEASE BEARING ASSEMBLY

BACKGROUND OF THE INVENTION

1. Field of the Invention

The present invention is generally concerned with the assembly comprising a clutch and the clutch release bearing required to control it.

It is more particularly directed towards the case where, in order to release the clutch, the clutch release bearing must act in traction on the clutch release device which the clutch comprises for this purpose.

The problem in this instance is that, although necessarily disposed for the main part outside the clutch, the clutch release bearing must nevertheless be able to act within the latter, on the internal surface of the clutch release device, so as to be capable of exerting traction on it.

2. Description of the Prior Art

To overcome this difficulty, it is usual to couple the clutch release bearing to the clutch release device in at least one axial direction, being that corresponding to traction on the clutch release device.

More precisely, for the purposes of such coupling of the clutch release bearing to the clutch release device, it is usual to associate with the latter an ancillary member, referred to hereinafter for convenience as the coupling member, which, on the side of the clutch release device opposite the clutch release bearing, has a radial flange through the intermediary of which it is adapted to bear on the clutch release device in the required axial direction.

It then remains to couple together the coupling member and the clutch release bearing in at least this direction, corresponding to traction on the clutch release device.

Various arrangements of differing complexity have been proposed to this end.

The simplest consists in the use, on the side of the coupling member opposite the clutch release bearing, of a ring referred to hereinafter for convenience as the coupling ring which is elastically deformable in the radial direction, extends annularly around the axis of the assembly and is at least in part engaged, on the one hand, on the same side as the clutch release bearing, with a bearing surface of the coupling member and, on the other hand, on the opposite side, with a bearing surface of the clutch release bearing.

At present, a ring of this kind is more often than not a simple split ring and has no function other than to provide the necessary axial coupling between the clutch release bearing and the coupling member.

As a result, it more often than not the case that the clutch release bearing must be fitted to the clutch release device of the clutch which it is to control in advance, even before the fitting of the latter, this fitting normally preventing subsequent fitting of the coupling ring within the device.

In other words, at present the clutch release bearing must normally be fitted in advance to the "clutch cover assembly" of a clutch of this kind.

In this context, as is usual, the term "clutch cover assembly" designates the assembly of the component parts of a clutch which, as a unit and inclusive of the clutch release device, are mounted on a reaction plate, or flywheel, with a friction disk inserted between them, to constitute a clutch of this kind.

The fact that a clutch release bearing which must operate in traction is fitted in advance to a clutch cover assembly of this kind complicates the assembly, and makes handling and packaging difficult, the clutch release bearing producing an unwanted increase in the overall axial dimension of the assembly during such handling and packaging.

Also, problems result during the joining together of the motor concerned and the corresponding gearbox, the casing of the latter normally being fitted in advance with the clutch release yoke which is needed to control the clutch release bearing and this clutch release yoke needing to be engaged on said clutch release bearing as the motor and the gearbox are brought axially towards one another for the purpose of fastening them together.

To overcome these problems it has been proposed to use snap-fastener means to provide the required axial coupling between the clutch release bearing and the coupling member for it provided on the clutch release device of the clutch to be controlled.

By virtue of such snap-fastener means, the clutch release bearing, which is in this case commonly referred to as of the "clip-on" type, can be fitted after the clutch release bearing itself has already been fitted to the corresponding reaction plate.

All that is necessary is to insert the clutch release bearing axially into the central opening in the clutch release device of the clutch cover assembly: during such insertion, the snap-fastener means employed retract elastically and, on subsequently resuming their initial configuration, provide the necessary axial retaining action.

Snap-fastener means of this kind may be fitted to the clutch release bearing.

They may also be fitted to the coupling member.

This is the case, in particular, in French patent application No. 81 22108 filed Nov. 20, 1981 and subsequently published under the number 2 494 796, in which they consist of a ring.

In all cases, it is also necessary to use retaining means adapted to axially couple to the clutch release device the coupling member associated with the latter, failing the provision of which, on engagement of the clutch release bearing, the coupling member would be entrained by the latter in the axial direction, without the required snap-fastener action being obtained.

In certain arrangements already known in the art, these retaining means form an integral part of the coupling member.

As an alternative, they may form a separate part.

This is the case, in particular, in French patent application No. 81 22108, in which they comprise a special ring.

In an arrangement of this kind, three separate parts are necessary to couple the clutch release bearing to the clutch release device to be controlled, namely the coupling member, the ring constituting the retaining means for the latter, and the ring providing for the snap-fastener type attachment of the clutch release bearing to the latter.

A general objective of the present invention is an arrangement whereby the number of parts required may be reduced.

SUMMARY OF THE INVENTION

In one aspect, the invention consists in a clutch release bearing assembly, adapted to couple a clutch release bearing to a clutch release device of a clutch in at least a first axial direction, being that corresponding to traction on said clutch release device by said clutch release bearing comprising, a coupling member having on its side opposite said clutch release bearing a radial flange through the intermediary of which it is adapted to bear axially on said clutch release device so as to actuate the latter in the required axial direction, retaining means adapted to axially couple said coupling member to said clutch release device, and a coupling ring adapted to couple said clutch release bearing to said coupling member at least in said first axial direction, wherein said retaining means are integral with said coupling ring.

In another aspect, the invention consists in a clutch cover assembly, adapted to couple a clutch release bearing to a clutch release device of a clutch in at least a first axial direction, being that corresponding to traction on said clutch release device by said clutch release bearing, comprising a coupling member having on its side opposite said clutch release bearing a radial flange through the intermediary of which it is adapted to bear axially on said clutch release device so as to actuate the latter in the required axial direction, retaining means adapted to axially couple said coupling member to said clutch release device, and a coupling ring adapted to couple said clutch release bearing to said coupling member at least in said first axial direction, wherein said retaining means are integral with said coupling ring, said coupling member comprises a bearing surface, and said coupling ring is elastically deformable in the radial direction, extends annularly around the axis the assembly and is at least in part engaged with said bearing surface of said coupling member.

In practice, the retaining means of the coupling member are formed by appropriately shaped parts of the coupling ring.

In this way, two parts are sufficient for coupling the clutch release bearing to the clutch release device on which it must act, namely the coupling member and the coupling ring.

Moreover, such coupling of the clutch release bearing to the clutch release device may with advantage take place when the corresponding clutch cover assembly is already mounted on the associated pressured plate, and thus after the fitting of the clutch cover assembly, the coupling ring in accordance with the invention advantageously and of itself constituting the snap-fastener means required for this purpose.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

To simplify the figures, the clutch cover assembly in accordance with the invention has not been represented in its entirety.

Only those components of a clutch cover assembly of this kind necessary to an understanding of the invention have been shown.

Nevertheless, it may be useful to remind the reader that, in a manner known per se, a clutch cover assembly of this kind is designed to be mounted on a reaction plate, or flywheel, with a friction disk inserted between them and that it comprises at lest two generally annular parts, namely a cover through the intermediary of which it is adapted to be attached to said reaction plate, and a pressure plate which is constrained to rotate with said cover whilst being moveable axially relative thereto and which is acted on by elastic clamping means which, under the control of a clutch release device 10, urge it continuously in the direction towards said reaction plate, in order to clamp said friction disk.

In practice, in the embodiment shown, it is assumed that, in a manner known per se, the elastic means to whose action the pressure plate and the clutch release device controlling these means are subjected can jointly form part of a common annular part, commonly referred to as a diaphragm spring, of which a circumferentially continuous peripheral part forms said elastic means and of which a central part, divided into radial fingers 11 by slots 12, forms said clutch release device 10.

Figure 1:
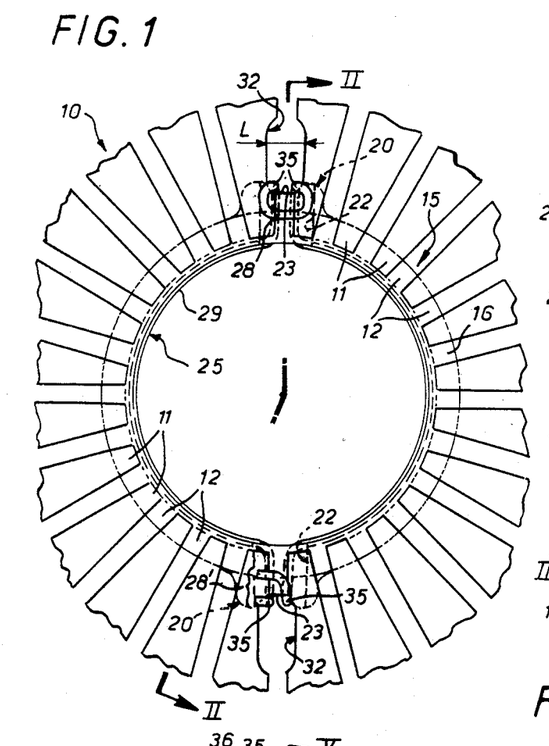
FIG. 1 is a partial view in elevation in the direction of the arrow I in FIG. 2 of a clutch cover assembly in accordance with the invention.
Figures 2, 3, 5:
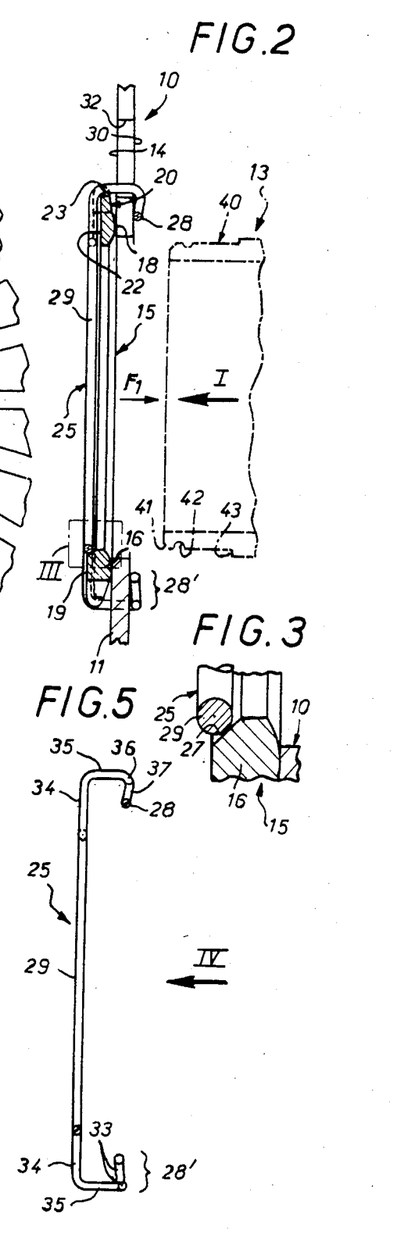
FIG. 2 is a view of it in partial axial cross-section on the broken line II—II in FIG. 1.
FIG. 3 shows to a larger scale the detail of FIG. 2 indicated by the box III thereon.
FIG. 5 is a view of this coupling ring in axial cross-section on the broken line V—V in FIG. 4.
Figures 6, 7, 8, 9, 10, 11:
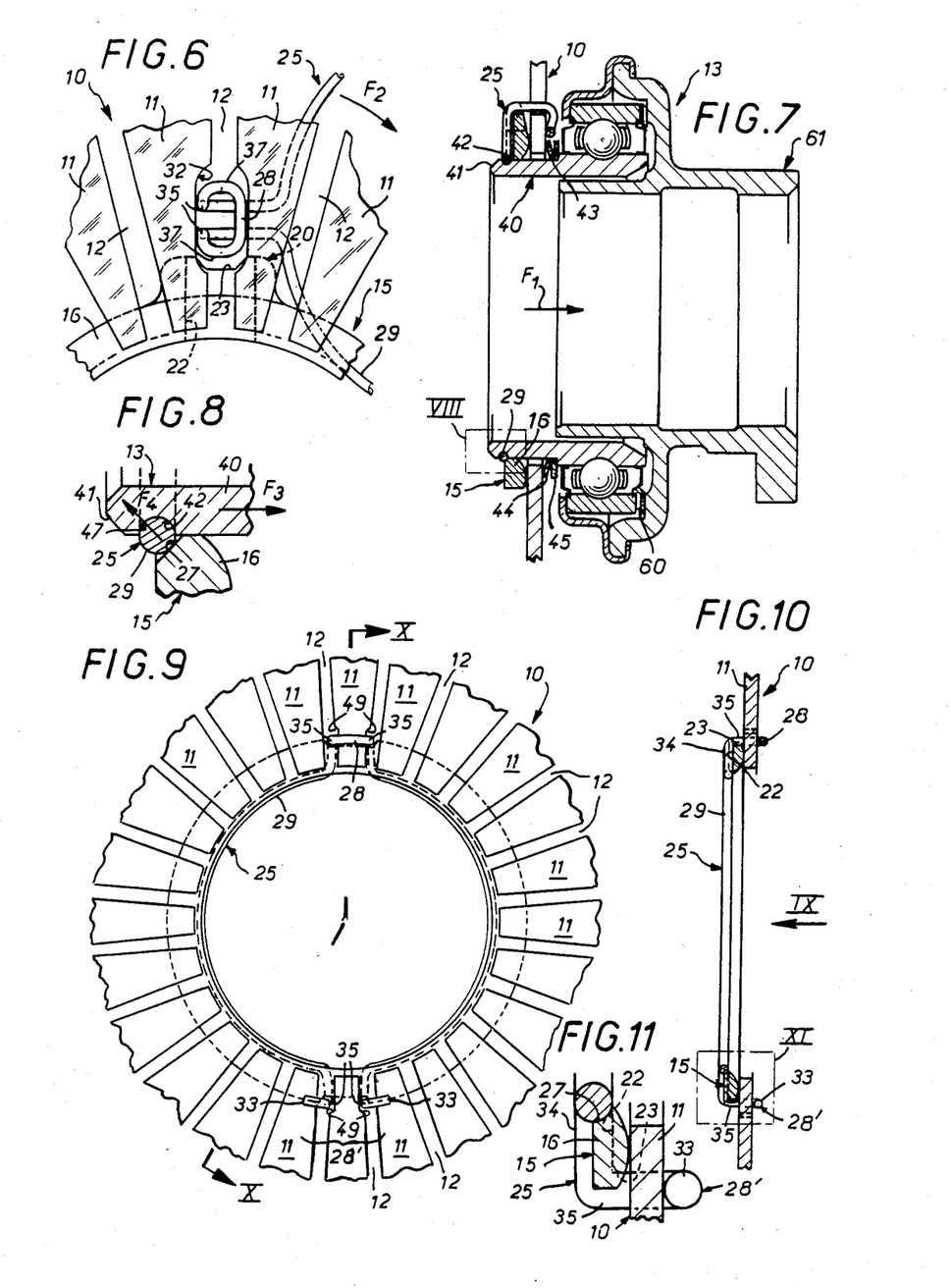
FIG. 6 shows part of FIG. 1 to a larger scale and illustrates the fitting of this coupling ring.
FIG. 7 is, in a similar way to FIG. 2, a partial view in axial cross-section illustrating the clutch release bearing assembly in accordance with the invention.
FIG. 8 shows to a larger scale the detail of FIG. 7 shown by the box VIII thereon.
FIGS. 9, 10 and 11 are views analogous to FIGS. 1, 2 and 3 respectively and relate to an alternative embodiment.

In a manner also known per se, in the case of a clutch cover assembly on the clutch release device 10 of which the associated clutch release bearing 13 must be able to act in traction in the direction which, marked by the arrow F1 in FIGS. 2 and 7, corresponds to a movement of this clutch release device away from the corresponding reaction plate, there is associated with a clutch release device 10 of this kind, on the internal surface 14 of the latter, that is to say on that of its surfaces which is directed towards the reaction plate, an ancillary part 15, hereinafter referred to for convenience as the coupling member, for coupling the clutch release bearing 13 to this clutch release device 10 in at least a first axial direction, being that corresponding to traction on said clutch release device 10.

As a general rule, a coupling member 15 of this kind has, on the internal surface 14 of the clutch release device 10, a radial flange 16 through the intermediary of which it is adapted to bear on the latter in the required axial direction.

In the embodiment shown in FIGS. 1 to 8, the coupling member 15 essentially consists of a flange 16 of this kind.

In practice, this is a relatively massive annular member of which the front surface 18, being that through the intermediary of which it is adapted to bear axially on the clutch release device 10, has a curved contour in transverse cross-section where it contacts said clutch release device 10, whereas its rear surface 19 is substantially plane and perpendicular to the axis of the assembly.

In the embodiment shown in FIGS. 1 to 8 and for reasons which will emerge hereinafter, the coupling member 15 thus constituted has at diametrically opposed positions on its external perimeter two radially projecting bosses 20 in line with each of which there is formed, on the one hand, on its rear surface 19, a radial rib 22 and, on the other hand, on its edge, an axial rib 23.

Associated with the coupling member 15 thus constituted are, in a manner known per se, retaining means which couple it axially to the clutch release device 10.

In accordance with the invention, these retaining means, to be described in more detail hereinafter, are integral with a ring 25, hereinafter, referred to for convenience as the coupling ring, which is elastically deformable in the radial direction, being to this end split by virtue of a gap 26 (FIG. 4), extends annularly around the axis of the assembly, and is at least partly engaged with a bearing surface 27 of the coupling member 15, on the side of the latter opposite the clutch release device 10 (FIGS. 2 and 3).

For reasons which will emerge hereinafter, this bearing surface 27 of the coupling member 15 is generally oblique relative to the axis of the assembly.

In practice, the retaining means associated with the coupling member 15 are formed by appropriately shaped parts of the coupling ring 25, in the general shape of a hook, extending from the rear towards the front and on each side of the clutch release device 10.

In order to provide these retaining means, the coupling ring 25 forms, in accordance with the invention, at least two members 28, 28', hereinafter referred to for convenience as retaining members, which are circumferentially distributed and which, offset radially outwards relative to the main part 29 of said coupling ring 25, that is the annular part through which this coupling ring 25 cooperates with the bearing surface 27 of the coupling member 15, are adapted to bear in the axial direction and at least in part, with or without clearance, on the clutch release device 10, on the external surface 30 of the latter, that is to say on the surface of the clutch release device 10 which, opposite the corresponding reaction plate, is also opposite the coupling member 15.

In the embodiment shown in FIGS. 1 to 8, the retaining members 28, 28' formed by the coupling ring 25 are two in number, being disposed in substantially diametrically opposite relationship to one and other, and benefit is drawn from the fact that, for reasons which are not relevant to the present invention, the clutch release device 10 itself has, in substantially opposed relationship to one another, two openings 32, extending in a substantially radial direction, and each formed by a local widening of the slot 12 separating the corresponding fingers 11, cutting into each of the latter in the vicinity of their free end.

The retaining members 28, 28' formed by the coupling ring 25 extend generally circumferentially.

One of them, the retaining member 28, is formed at a position substantially diametrically opposite the gap 26 in the coupling ring 25, and comprises only a single strand.

The other, the retaining member 28', is on the contrary formed in line with this gap 26 and comprises two strands, one of which is offset radially relative to the other, and which are formed by respective end portions 33 of the coupling ring 25.

In the embodiment shown in FIGS. 1 to 8, these two strands extend in the same circumferential direction.

Figure 4:
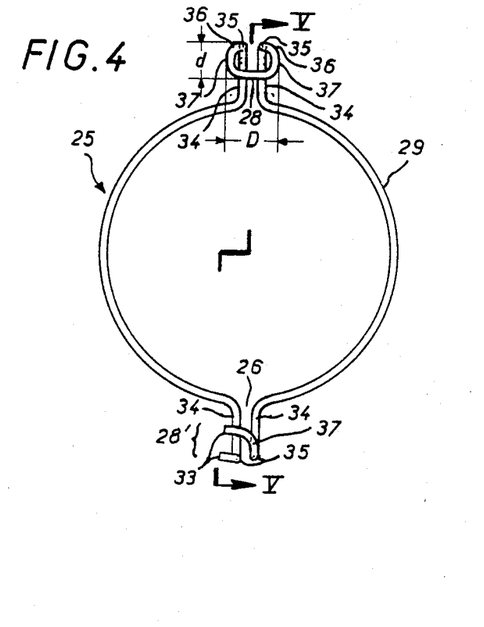
FIG. 4 is a view in elevation in the direction of the arrow IV in FIG. 5 of the single coupling ring employed in the clutch cover assembly in accordance with the invention, shown in isolation.

At each end the single-strand retaining member 28 is preceded by, in succession and for the purpose of connecting it to the main part 29 of the coupling ring 25, and starting from the latter, a substantially radial part 34 of the coupling ring 25 and then a substantially axial part 35 thereof (FIGS. 4 and 5).

In the embodiment shown in FIGS. 1 to 8, between an axial part 35 and the corresponding end of the retaining member 28, the coupling ring 25 has, in succession, a generally circumferentially extending part 36 and a part 37 extending in a substantially radial direction towards the axis of the assembly.

Thus, as mentioned hereinabove, the coupling ring 25 generally forms, in so far as the retaining member 28 is concerned, a hook extending from each of its corresponding axial portions 35, at the rear, to the retaining member 28, at the front.

In practice, the circumferential portions 36 which the coupling ring 25 features extend in opposite circumferential directions so that, together with the retaining member 28, these circumferential portions 36 and the radial portions 37 which link them to said retaining member 28 resemble, when seen in a plane transverse to the assembly, an open loop with a gap.

The retaining member 28 thus being bordered by two radial portions 37 of the coupling ring 25, the circumferential distance D between said radial parts 37, as measured to their outside, is greater than the circumferential width L of the opening 32 in the clutch release device 10.

On the other hand, measured under the same conditions, the radial distance d between the retaining member 28 and circumferential portion 36 of the coupling ring 25 is less than the circumferential width L of the opening 32 in the clutch release device 10.

Likewise, the two strands constituting the retaining member 28' are each preceded by, in succession and starting from the main part 29 of the coupling ring 25, a radial portion 34 and an axial portion 35 of the ring, one of these strands, being that radially nearer the axis of the assembly, being in turn preceded, beyond the corresponding axial part 35, by a radial part 37 of said coupling ring 25.

For preference, the two strands thus forming the retaining member 28' are axially offset relative to one another, that radially furthest from the axis of the assembly being also axially furthest from the clutch release device 10.

Clearance is thus with advantage provided for the clutch release device 10 as it moves in order to disengage the clutch concerned.

As previously, the coupling ring 25 generally forms, in so far as the retaining member 28' is concerned, a hook extending from each of its corresponding axial portions 35, at the rear, to the retaining member 28', at the front.

By virtue of the radial portions 34 which it features and which are substantially rectilinear in the embodiment shown in FIGS. 1 to 8, the coupling ring 25 is engaged with the radial ribs 22 of the coupling member 15 and, by virtue of its axial portions 35, which are also substantially rectilinear in this embodiment, it is engaged with the axial ribs 23 of this coupling member 15, which constrains it to rotate with the latter.

The axial portions 35 of the coupling ring 25 thus extend externally of the coupling member 15 in the embodiment shown in FIGS. 1 to 8.

Moreover, the axial parts 35 of the coupling ring 25 extend axially through the clutch release device 10, by virtue of the openings 32 in the latter.

With the coupling member 15 applied to the internal surface 14 of the clutch release device 10, the coupling ring 25 needed to hold it in position may be fitted in the manner now to be described.

In a first stage (FIG. 6), the retaining member 28 is offered up in line with the corresponding opening 32 in the clutch release device 10, extending substantially radially along one edge of the latter.

As shown in FIG. 6, this involves placing the coupling ring 25 in a position which is substantially at right angles to but in substantially the same plane as its final fitted position.

By virtue of the dimensional considerations specified hereinabove, the loop formed by the retaining member 28 and the parts 36 and 37 of the coupling ring 25 which border it can then be engaged axially in the opening 32 concerned in the clutch release device 10 until it projects beyond the external surface 30 of the latter.

In a second stage, the coupling ring 25 is then rotated in its plane through approximately 90°, as shown by the arrow F2 in FIG. 6, so as to bring it into a position which is substantially coaxial with the assembly and close to its final fitted position.

At the end of this rotation, the radial portions 37 of the coupling ring 25 engage on the fingers 11 of the clutch release device 10 bordering the corresponding opening 32 in the latter.

Also, during this rotation, that of the fingers 11 of the clutch release device 10 which, bordering the opposite opening 32 in the latter, is on the downstream side in the direction of such rotation, is bent in the axial direction at its free end so that, at the end of said rotation, the end portions 33 of the coupling ring 25 forming the retaining member 28 of the latter are also engaged on a finger of this kind.

It is then merely necessary to allow the latter to return to its initial unstressed configuration.

As will be noted, when the coupling ring 25 is fitted as described, its axial portions 35 are substantially in contact with the corresponding edges of the openings 32 in the clutch release device 10 through which they pass, which ensures a general centering relative to the clutch release device 10 of the combination comprising the coupling ring 25 and the coupling member 15; however, it is preferable to leave minimal clearance so as to permit self-centering of the release bearing 13, if required, while permitting effective assembly of the latter.

Be this as it may, the release bearing 13 is held against the internal surface 14 of the clutch release device 10 by the coupling ring 25.

The clutch release bearing 13, which is adapted to be coupled by the coupling ring 25 to the coupling member 15 and by the latter to the clutch release device 10, does not of itself constitute part of the present invention.

Thus it will not be described in detail here.

It is, moreover, a conventional clutch release bearing.

It suffices to indicate that the driving member 40 of this clutch release bearing 13, that is to say the part thereof by means of which it is adapted to operate on the clutch release device 10, sufficiently extended in the axial direction for this purpose, has at its free end a frustoconical engagement bearing surface 41 and, slightly beyond this, an annular groove 42, and that in the embodiment shown it is a self-centering clutch release bearing of the maintained self-centering action type, an axially acting elastic washer 60 being operative between said drive member 40 and the associated operating member 61, that is to say the member by means of which a clutch release bearing of this kind is adapted to be acted on by a control member, in practice a clutch release yoke.

In the embodiment shown in FIGS. 1 to 8, the drive member 40 of the clutch release bearing 13 further comprises a transverse shoulder 43 on which bears an elastic washer 44 through the intermediary of a spacer washer 45, as shown in FIG. 7.

A spacer washer 45 and an elastic washer 44 of this kind being fitted, the drive member 40 of the clutch release bearing 13 is inserted in the central opening in the clutch release device 10, which leads into those of the coupling member 15 and coupling ring 25.

During this insertion, the drive member 40 of the clutch release bearing 13 comes into contact with the coupling ring 25 through its frustoconical engagement bearing surface 41.

However, since the coupling ring 25 is retained in the axial direction by the clutch release bearing 10, by virtue of the retaining members 28, 28' which it forms being in contact with the external surface 30 of the latter, it is merely constrained by the drive member 40 of the clutch release bearing 13 to elastically open out in the radial direction, to permit the latter to pass through.

When the annular groove 42 in the drive member 40 comes into line with the coupling ring 25, the latter automatically engages in it by returning to its initial configuration or nearly so.

In the clutch release bearing assembly thus implemented, the coupling ring 25 (more precisely, its annular main part 29) is engaged, on the one hand, on the same side as the clutch release bearing 13 with a bearing surface 27 of the coupling member 15 and, on the other hand, on the other side, with a bearing surface 47 of the clutch release bearing 13 formed by the corresponding flank of the annular groove 42 in the latter.

By virtue of this arrangement, if the clutch release bearing 13 is subjected to axial movement in the direction of the arrow F3 in FIG. 8, it tends to entrain in the same direction the coupling ring 25 and the coupling member 15 and thus, through the intermediary of these, exerts the required traction on the clutch release device 10.

Because of the oblique disposition of the bearing surface 21 on the coupling member 15, any axial movement of the clutch release bearing 13 in the direction in question tends to anchor the coupling ring 25 more securely in the groove 42 in the latter, as shown by the arrow F4 in FIG. 8.

There is thus provided, by simple snap-fastener action, a positive linkage in the axial direction corresponding to traction on the clutch release device 10 between the clutch release bearing 13 and the coupling member 15 through the intermediary of which the latter acts on said clutch release device 10.

In the embodiment shown, the elastic washer 44 which bears directly on the clutch release device 10 also provides an elastic linkage in the opposite axial direction between the clutch release bearing 13 and the clutch release device 10.

In the alternative embodiment shown in FIGS. 9 to 11, the retaining member 28 formed by the coupling ring 25 is directly linked to the corresponding axial portion 35 of the latter, without intermediate circumferential and/or radial parts, and, said axial portions 35 bordering the same finger 11 of the clutch release device 10, each passing through the respective slot 12 in the latter on either side of the finger 11, the retaining member 28 extends circumferentially in contact with the latter.

Conjointly, the end portions 33 of the coupling ring 25 forming the retaining member 28' of the latter are both directly linked to the corresponding axial portions 35 and extend in opposite circumferential directions, to bear on two separate fingers 11 of the clutch release device 10 separated by a third.

A coupling ring 25 of this kind may be fitted in the following manner: the end portions 33 of the coupling ring 25 forming the retaining member 28' being engaged on the corresponding fingers 11 of the clutch release device 10, the combination comprising the coupling ring 25 and the coupling member 15 is slid in its plane, the finger 11 of said clutch release device 10 between those previously mentioned being bent in the axial direction so as to permit such sliding, until, arriving at the end of the finger 11 of the clutch release device 10 on which it must be engaged, the retaining member 28 is able to engage thereon; by sliding in the reverse direction, the assembly comprising the coupling ring 25 and the coupling member 15 is then brought to its final position.

For preference, and in order to facilitate such fitting, the end of the finger 11 of the clutch release device 10 on which the retaining member 28 must be engaged is of reduced width, as shown, and the same applies to the diametrically opposite finger 11.

Thus the corresponding fingers 11 of the clutch release device 10 have, on their edge, shoulders 49 against which may abut the axial parts 35 of the coupling ring 25, which centers the combination comprising the coupling ring 25 and the coupling member 15 on the clutch release device 10.

In the alternative embodiments shown in FIGS. 12 to 22, the coupling member 15 is stamped from sheet metal, rather than being of massive construction, as previously.

Figures 12, 13, 14, 15, 16, 17:
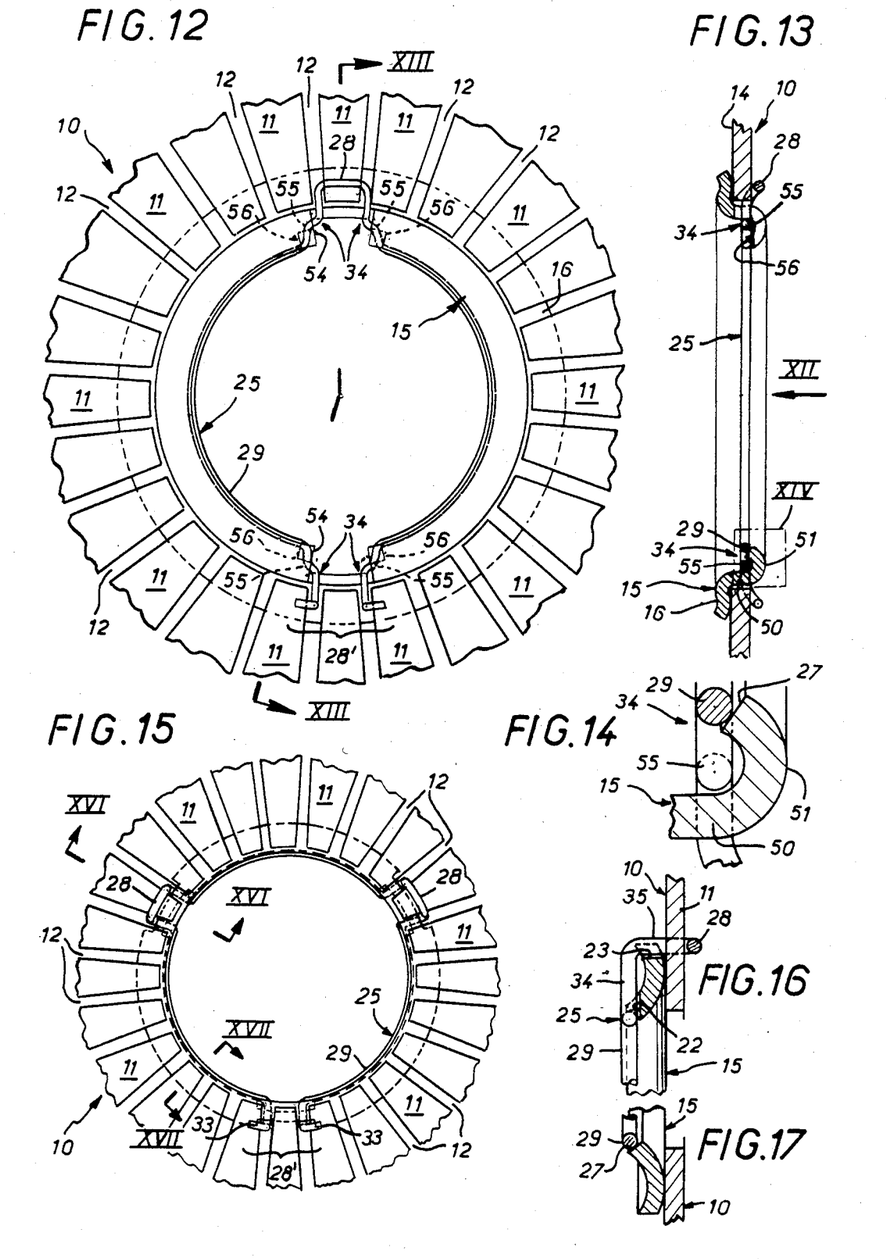
FIGS. 12, 13 and 14 are views analogous to FIGS. 1, 2 and 3 respectively and relate to another alternative embodiment.
FIG. 15 is a view analogous to that of FIG. 1 and relates to a further embodiment.
FIGS. 16 and 17 are partial views in cross-section and to a larger scale of this further embodiment, on the respective lines XVI—XVI and XVII—XVII in FIG. 15.

In the embodiment shown in FIGS. 12 to 14, in addition to a bearing flange 16 extending, as previously, substantially radially in a plane transverse to the assembly in contact with the internal surface 14 of the clutch release device 10, it comprises an axial part 50 forming a bush by means of which it is engaged axially in the central opening in the clutch release device 10.

At the end axially opposite the bearing flange 16, this axial part 50 is itself extended by a flange 51 which extends substantially radially in a plane transverse to the assembly, but towards the axis of the assembly.

As seen in axial cross-section, this radial flange 51 is bent back on itself in such a way that its edge, which is obliquely disposed, is on the same side as the internal surface 14 of the clutch release device 10.

It is this end surface which in practice forms the bearing surface 27 of the coupling member 15 through which the latter is adapted to cooperate with the annular main part 29 of the coupling ring 25.

It extends substantially in the plane of the clutch release device 10.

As previously, the coupling ring 25 itself forms two retaining members 28, 28', the first with a single strand, the second with two strands extending in opposite circumferential directions.

However, in the embodiment shown, these retaining members 28, 28' are preceded, at their ends, only by substantially radial portions 34 of the coupling ring 25. The latter pass radially through the coupling member 15 by means of notches 54 formed at diametrically opposite positions in the axial part 50 and in the radial flange 51 of the coupling member 15.

In a plane transverse to the assembly, which is also in practice the plane in which extends its main part 29, the radial portions 34 of the coupling ring 25 feature a kink 55 by virtue of which, exiting the corresponding notch 54 in the coupling member 15, each comes into line with a notch 56 in the latter, permitting them to be linked to said main part 29.

In an axial plane, the radial parts 34 of the coupling ring 25, the main parts of which extend through the slots 12 in the clutch release device 10, are slightly curved so as to permit the corresponding retaining member 28, 28' to engage on the relevant fingers 11 of the clutch release device 10.

As will be noted, this embodiment enables the associated clutch release bearing 13 to be attached substantially in line with the central opening in the clutch release device 10, minimising the overall axial dimension of the assembly.

In the embodiments shown in FIGS. 15 to 22, the coupling member 15 is reduced to its bearing flange 16, as in the embodiments shown in FIGS. 1 to 11, but without being of massive construction, its bearing surface 27 being formed directly by the appropriately oriented edge of its internal perimeter. In order to retain this coupling member 15 in position, the coupling ring 25 forms not just two but three retaining members, regularly spaced at 120°.

Figure 21:
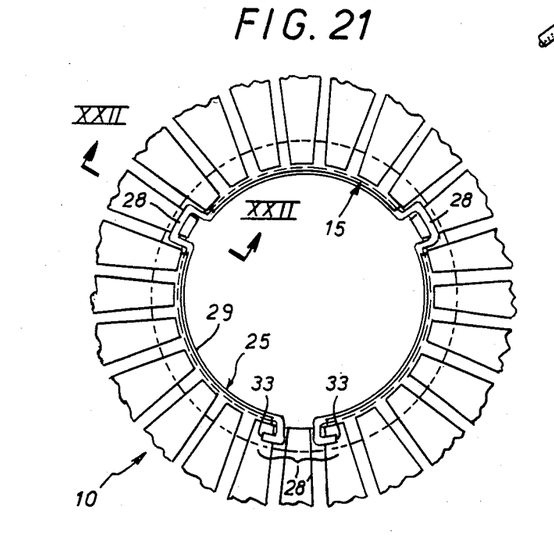
FIG. 21 is a view analogous to that of FIG. 1 and relates to a still further embodiment.
Figure 22:
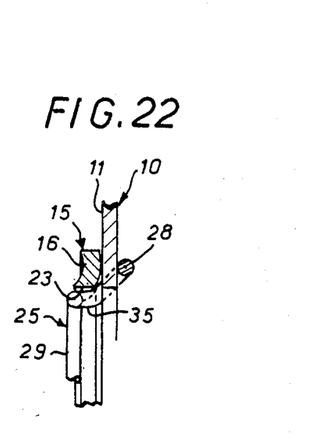
FIG. 22 is a partial view of this embodiment to a larger scale in axial cross-section on the line XXII—XXII in FIG. 21.

In the embodiment shown in FIGS. 15 to 17 and in that shown in FIGS. 21 and 22, there are two retaining members 28 with a single strand and one retaining member 28' with two strands formed by the respective end portions 33 of the coupling ring 25, which extend in opposite circumferential directions.

The embodiment shown in FIGS. 15 and 17 is generally similar to that shown in FIGS. 9 to 11: the axial parts 35 of the coupling ring 25 preceding the retaining members 28, 28' extend externally of the coupling member 15.

Also as previously, by means of its axial parts 35 the coupling ring 25 is engaged with the axial ribs 23 on the coupling member 15, whereas by its aforementioned parts 34 it is engaged with the ribs 22 on the rear face of the coupling member 15.

In a variant (FIGS. 21 and 22), the axial parts 35 of the coupling ring 25, which are joined directly to the main part 29 of the latter, extend internally, rather than externally, of the coupling member 25 whilst being engaged, as previously, with the axial ribs 23 of the latter.

In practice, to permit the retaining members 28, 28' to engage on the relevant fingers 11 of the clutch release device 10, the axial parts 35 of the coupling ring 25, which extend through the slots 12 in the clutch release device 10, are slightly bent, as seen in an axial plane and as can be seen in FIG. 22 in the case of one of them.

As will be noted, in this embodiment the retaining members 28, 28' may with advantage be axially in line with the circumference along which the coupling member 15 bears axially on the clutch release device 10.

The same may naturally apply to the foregoing embodiments, and in particular those shown in FIGS. 1 to 8 and 12 to 14, through appropriate shaping of the coupling ring 25.

Figure 18:
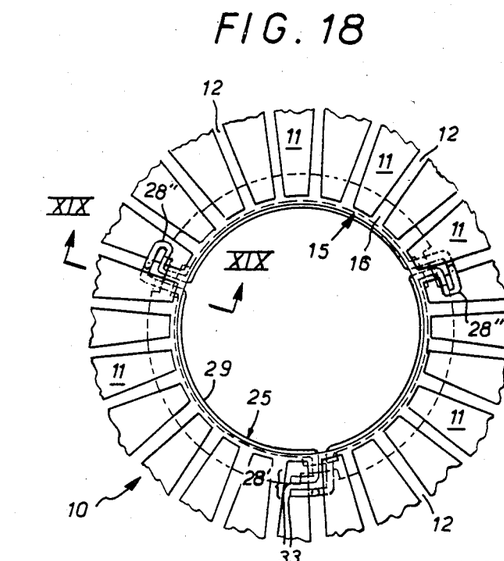
FIG. 18 is a view analogous to that of FIG. 1 and relates to a yet further embodiment.
Figure 19:
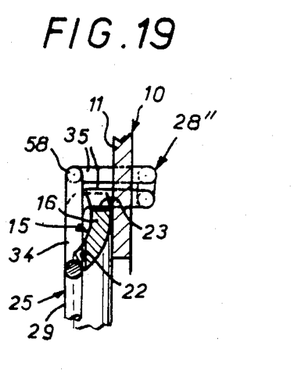
FIG. 19 is a partial view to a larger scale of this yet further embodiment on the line XIX—XIX in FIG. 18.
Figure 20:
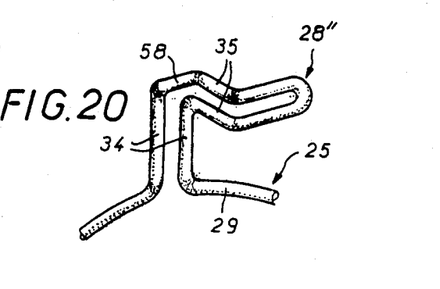
FIG. 20 is a partial view in perspective of the single coupling ring employed in this embodiment, shown in isolation.

In the embodiment shown in FIGS. 18 and 19, all the retaining members formed by the coupling ring 25 have two strands.

However, while in the case of the retaining member 28' these are, as previously, the end portions 33 of the coupling ring 25, in the case of the other two retaining members 28" they are formed by folding the coupling ring 25 back upon itself in a U-shape.

In practice, in the embodiment shown, the three retaining members 28', 28" extend in the same circumferential direction, the two end portions 33 of the coupling ring 25 being themselves directed in the same circumferential direction, as in the embodiment shown in FIGS. 1 to 8.

Because of this, the coupling ring 25 may be fitted by means of a bayonet-type assembly: the fingers 11 of the diaphragm spring on which the retaining members 28', 28" must engage being temporarily bent in the axial direction, the coupling ring 25 is offered up axially and then rotated about the axis of the assembly until said retaining 28', 28" come into line with said fingers 11, whereupon the latter are released.

For preference, and as can be seen in FIG. 19 in the case of one of the retaining member 28", the two strands constituting each of the retaining members 28', 28" are each offset axially, as described with reference to the embodiment shown in FIGS. 1 to 8.

Moreover, as previously, each of the retaining members 28', 28" is preceded at its end by radial portions 34 and axial portions 35 of the coupling ring 25 with an intermmediate circumferential part 58 in the case of that of the strands which is farthest from the center; by means of its radial portions 34 the coupling ring 25 is engaged with the radial ribs 22 of the coupling member 15, whereas by means of its axial portions 35 it is engaged with the axial ribs 23 of the latter.

As will be noted, in all the embodiments described hereinabove, the coupling ring forms a hook at each end of its retaining members, extending from the rear towards the front, and on either side of the clutch release device, as in the embodiment described with reference to FIGS. 1 to 8.

It will be understood that various changes in the details, materials and arrangements of parts, which have been herein described and illustrated in order to explain the nature of the invention, may be made by those skilled in the art within the principle and scope of the invention as expressed in the appended claim.

In all cases the coupling ring employed and forming, in accordance with invention, retaining members for the coupling member, may with advantage be economically fabricated, in the usual manner, from an appropriately cut and bent spring wire of circular transverse cross-section.

Conjointly, the clutch release bearing may with advantage be a conventional clutch release bearing, having no special features other than a simple groove on its drive member, for coupling it to the coupling member which enables it to operate on the clutch release device which it is to control.

Moreover, by the locking of the coupling ring into this groove in the drive member of the clutch release bearing, in particular under the action of the elastic washer 44, said drive member is constrained in the usual manner to rotate with said ring.

However, as the latter is itself, in accordance with the invention, constrained to rotate with the clutch release device, the coupling ring itself constrains the drive member of the clutch release bearing to rotate with said clutch release device, this constituting one advantage of the invention.

Furthermore, by virtue of the action of the coupling ring itself, and more precisely by virtue of the action of the hook which it features at each end of each of its retaining members, the latter may of themselves be in elastic bearing engagement with the clutch release device so as to bring about, without any elastic washer 44, an elastic coupling in the axial direction concerned between the clutch release bearing and said clutch release device, provided that there is no clearance between the coupling ring and the drive member of said clutch release bearing.

Finally, in most cases and by virtue of the shaping of the coupling ring in accordance with the invention, it is virtually impossible for the coupling member to be inadvertantly detached from the clutch release device, it being understood that, in this connection, the embodiments with three retaining members are more favourable, although those comprising only two retaining members are easier to fabricate with precise geometry.

There is claimed:

1. A clutch release bearing assembly adapted to be axially coupled to a clutch release device of a clutch in an axial clutch release direction, said clutch release bearing assembly comprising a clutch release bearing for operating the clutch release device, said clutch release device having a side positioned axially remote from said clutch release bearing, a coupling member having a radial bearing flange operably engageable with said side of the clutch release device axially remote from said clutch release bearing, retaining means for axially coupling said coupling member to the clutch release device, a coupling ring for axially coupling the clutch release bearing to said coupling member in the clutch release direction, said retaining means being integral with said coupling ring.

2. A clutch release bearing assembly according to claim 1, the clutch release device being a diaphragm spring having radially inwardly extending fingers, said fingers each having a side disposed axially remote from said bearing flange, and said retaining means including portions of said coupling ring extending over portions of the fingers on said sides axially remote from said bearing flange.

3. A clutch cover assembly including a clutch release device and having an axial clutch release direction, and a clutch release bearing assembly comprising a clutch release bearing for operating said clutch release device, said clutch release device having a side positioned axially remote from said clutch release bearing, a coupling member having a radial bearing flange operably engageable with said side of said clutch release device axially remote from said clutch release bearing, retaining means for axially coupling said couplin member to said clutch release device, a coupling ring for axially coupling said clutch release bearing to said coupling member in said clutch release direction, said retaining means being integral with said coupling ring.

4. A clutch assembly according to claim 3, wherein said retaining means includes portions of said coupling ring extending over portions of said clutch release device on the side of the clutch release device axially remote from said bearing flange.

5. A clutch assembly according to claim 3, wherein said retaining means includes at least two circumferentially spaced retaining members adapted to bear axially against portions of said clutch release device on said side of the clutch release device axially remote from said bearing flange.

6. A clutch assembly according to claim 5, wherein at least one of said retaining members extends circumferentially.

7. A clutch assembly according to claim 5, wherein at least one of said retaining members includes a single portion of said coupling ring.

8. A clutch assembly according to claim 5, wherein said at lest one retaining member is radially offset relative to a remainder of said coupling ring.

9. A clutch assembly according to claim 5, wherein said coupling ring includes a radial part adjacent at least one of said retaining members.

10. A clutch assembly according to claim 5, wherein at least one of said retaining members includes a double portion of said coupling ring.

11. A clutch assembly according to claim 10, wherein said coupling ring includes a split ring having terminal portions and said double portion of said at least one retaining member is formed by a respective one of said terminal portions of said split ring.

12. A clutch assembly according to claim 11, wherein said double portion includes a double strand of said coupling ring folded back on itself.

13. A clutch assembly according to claim 5, wherein said coupling ring includes an axial part adjacent at least one of said retaining members and extending axially through said clutch release device.

14. A clutch assembly according to claim 13, wherein said axial part is arranged radially outwardly of said coupling member.

15. A clutch assembly according to claim 13, wherein said axial part is arranged radially inwardly of said coupling member.

16. A clutch assembly according to claim 13, wherein said axial part of said coupling ring is substantially rectilinear.

17. A clutch assembly according to claim 13, wherein said axial part lies in an axial plane of the assembly.

18. A clutch assembly according to claim 13, wherein said coupling ring includes a substantially radial part adjacent said axial part.

19. A clutch assembly according to claim 18, wherein said radial part is substantially rectilinear.

20. A clutch assembly according to claim 18, wherein said radial part has a steplike inflection zone in a transverse plane of the assembly.

21. A clutch assembly according to claim 13, wherein said coupling ring includes a substantially circumferential part and a substantially radial part between said axial part and an adjacent said at least one retaining member.

22. A clutch assembly according to claim 21, wherein said one retaining member is disposed between two said radial parts of said coupling ring, said clutch release device having an opening through which said axial part of said coupling members passes, the circumferential distance between said radial parts being greater than the circumferential width of said opening.

23. A clutch assembly according to claim 13, wherein said coupling member includes a groove and said coupling ring is received in said groove.

* * * * *